A. H. MAÎTRE & V. H. MARTIN.
CONTACT INTERRUPTER.
APPLICATION FILED AUG. 11, 1909.
1,106,230.
Patented Aug. 4, 1914.
3 SHEETS—SHEET 2.
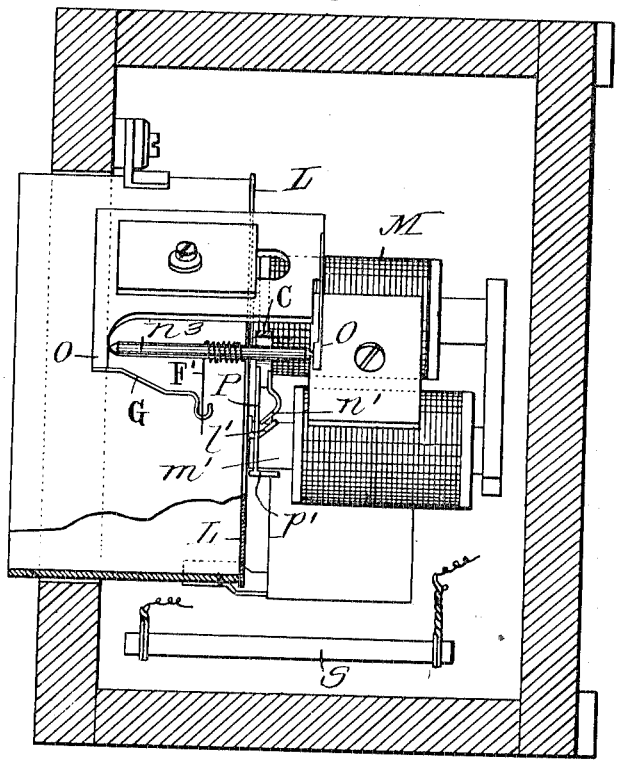
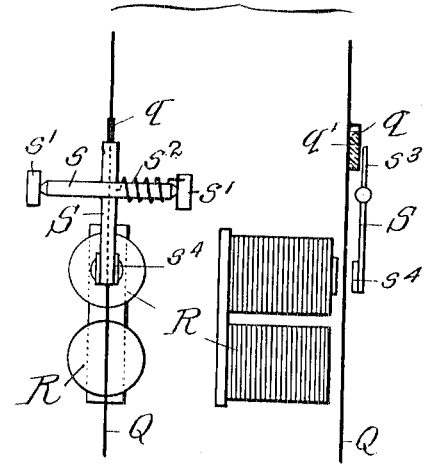
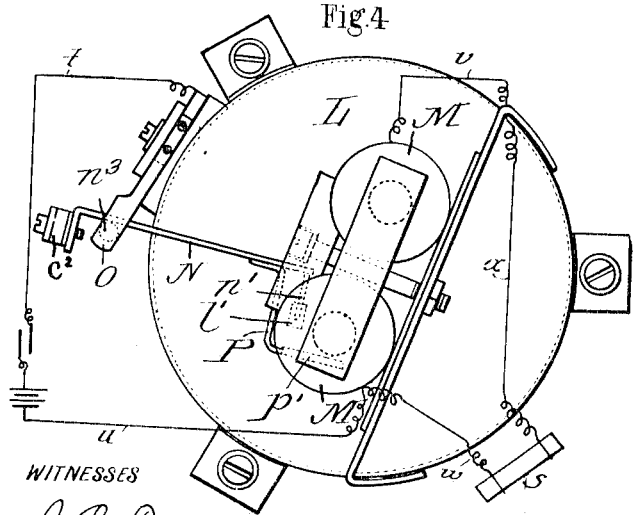
WITNESSES
J. P. Davis
INVENTORS
Alcide Hector Maître
Victor Henri Martin
BY
Munn & Co
ATTORNEYS

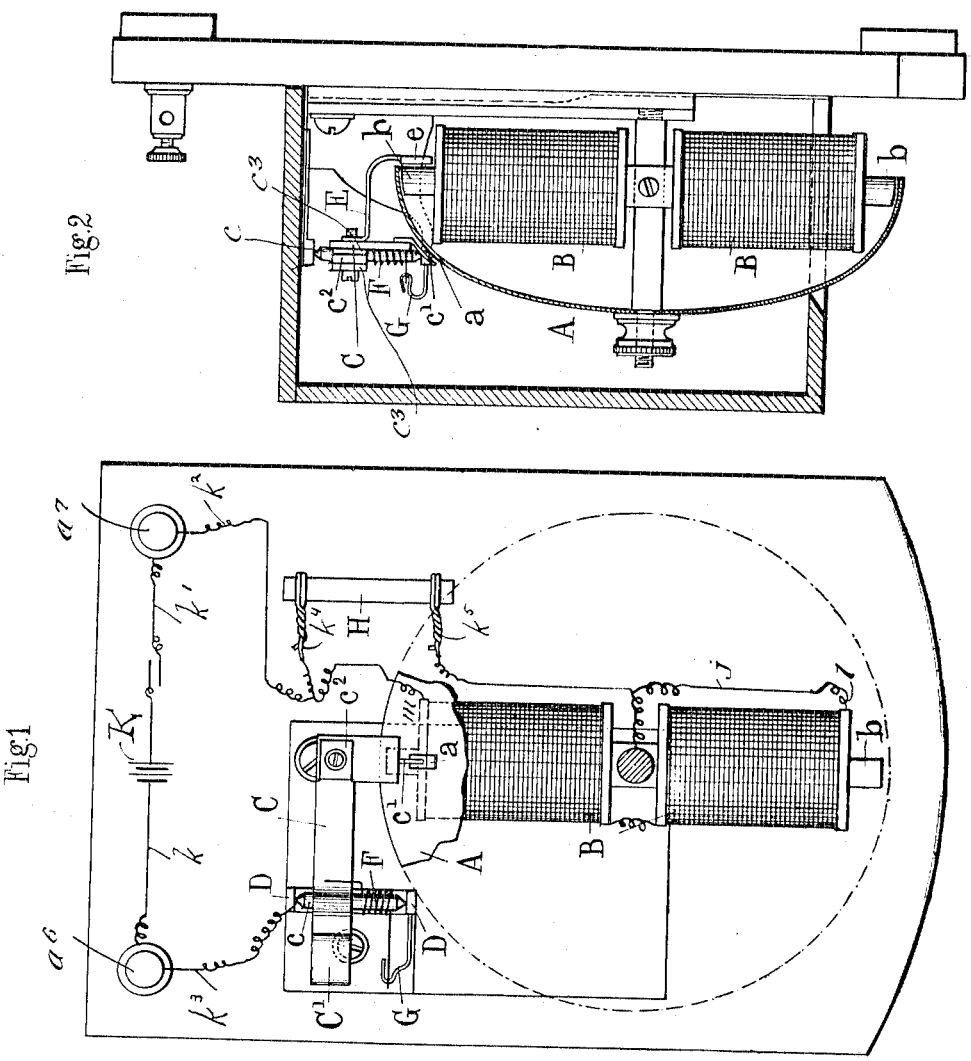

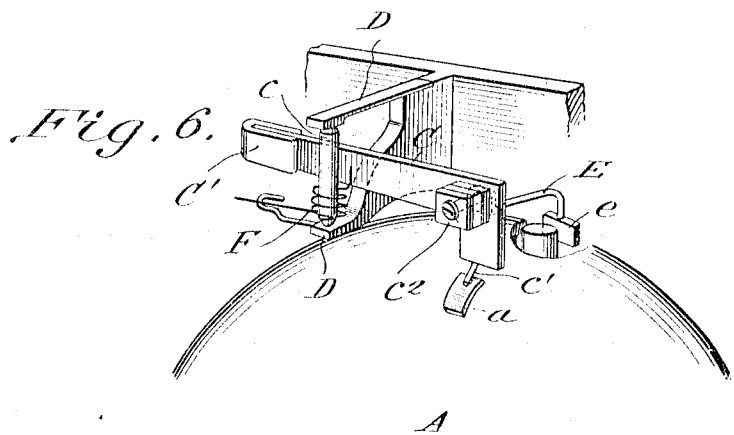
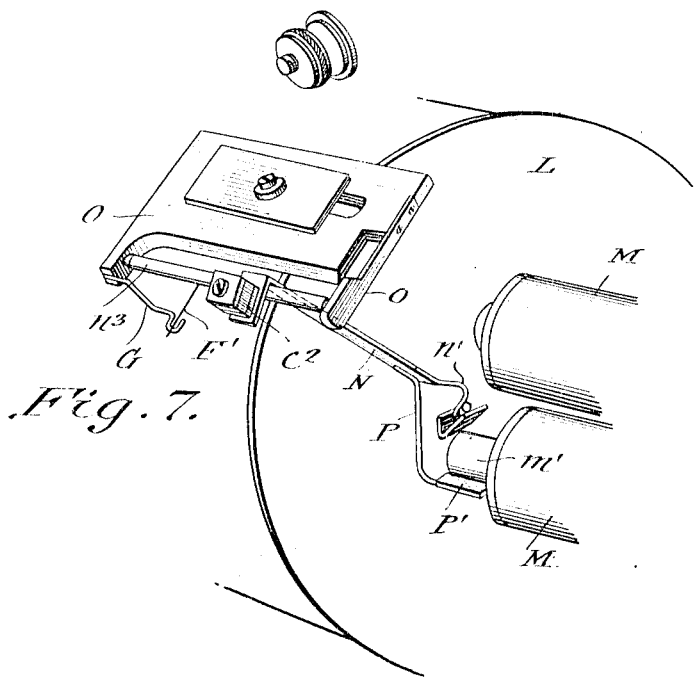

UNITED STATES PATENT OFFICE.

ALCIDE HECTOR MAÎTRE AND VICTOR HENRI MARTIN, OF ROUEN, FRANCE.

CONTACT-INTERRUPTER.

1,106,230. Specification of Letters Patent. Patented Aug. 4, 1914.

Application filed August 11, 1909. Serial No. 512,355.

*To all whom it may concern:*

Be it known that we, ALCIDE HECTOR MAÎTRE and VICTOR HENRI MARTIN, both citizens of the Republic of France, and residents of 92 Rue de la Republique, Rouen, France, have invented a new and useful Contact-Interrupter, which is fully set forth in the following specification.

This invention relates to a contact interrupter device applicable to apparatus in which a part is to be caused to vibrate by electro-magnetic action with vibrations of very small amplitude. Among these appliances electric bells with direct vibration of the bell may be cited, the bell forming an armature of an electromagnet; also appliances termed electric trumpets in which the sound vibrations are produced by a sheet metal plate subjected to the action of an electro-magnet. The appliances of this nature in accordance with the arrangement heretofore adopted present the defect that their operation is irregular and uncertain by reason of the fact that the contact member is fixed relatively to the vibrating member which is the bell or the plate and that the separation of the contact parts forming the circuit interrupter is effected with a very small amplitude which leads to irregular operation and necessitates having very delicate contact parts in order not to alter the sound, the adjustment of these parts being minute and variable in accordance with the magnitude of the source of electricity and affected by the least deformations and particularly sensitive to oxidation or alterations resulting from the passage of the current.

The apparatus which forms the object of the present invention obviates these defects. It is broadly characterized by the fact that the contact part serving to form the electric circuit by its contact with the body of a vibrating bell, or plate is not fixed, but is carried by a movable arm rocking on a suitable pivot in such a manner that it has a displacement of small amplitude by means of which the contact part may be brought against the vibrating plate or bell or separated therefrom by a small interval. This movable arm carries a pallet which constitutes an armature subjected to the electro-magnet employed for vibrating the bell or the plate. As a result of this arrangement, as soon as the electro-magnet exerts its attraction upon the body of the vibrating plate or bell it attracts at the same time the pallet of the movable arm carrying the contact so that the break in the circuit between the body of the bell or the plate and the contact part takes place definitely and thereby insures a clear and regular vibration and also enables strong contact pieces to be used, so that the slight alteration of the surface of the metal which in prior appliances has been a cause of breakdown, remains without importance.

The invention will now be described with reference to the accompanying drawing, in which:—

Figures 1 and 2 show by way of example the appliance of the invention to a bell. Fig. 3 is a vertical section through a modified construction, wherein an electric trumpet is operated instead of a bell, Fig. 4 is a front view of the device with the case removed, Fig. 5 is a front and side view showing the application of the invention to the treble strings of a piano. Fig. 6 is a partial perspective view of the construction shown in Fig. 1, and Fig. 7 is a similar view of the construction shown in Fig. 3.

In Figs. 1 and 2, Fig. 1 is an elevation showing the bell in part, and Fig. 2 is a section.

A indicates the bell which is of steel or comprises an iron portion which constitutes the armature of an electro-magnet B arranged inside it, one of the poles $b$ coming into proximity with the edges of the bell. The body of the bell forms one part of an interrupter of the circuit of the electro-magnet B, the other part of the interrupter being formed by the movable contact device which forms the object of the present invention. This contact consists of a plate C with a plate or arm C′ forming a counterweight mounted upon a spindle $c$ supported and rocking between points on two supports D. This plate or arm C carries the contact part which consists of a small strip or wire of platinum or other unoxidizable metal $c'$, which when the plate is at rest touches the bell A at a point where the bell carries a small plate of unoxidizable metal $a$. On the plate C there is fixed a rod E carrying a part which constitutes an armature arranged opposite one of the poles $b$ of the electro-magnet.

The weight of the plate C and the parts carried thereby, (namely, the strip or contact part $c'$, the armature $e$ and the arm E which carries the armature $e$) is so arranged with respect to its pivotal support that when at rest the contact part $c'$ touches the plate $a$ of the bell and the armature $e$ is slightly separated from the core $b$ of the electro-magnet B. The plate C with the parts rigid therewith is appropriately placed in position and centered for operating whatever the position the apparatus occupies, whether against a vertical surface or upon a horizontal surface; a small spring F attached on the one hand to the spindle $c$ and supported on the other hand on a fixed arm G, regulates the pressure of the contact or strip $c'$ with the bell and adds its action to the weight of the plate C, so as to impart to the latter and the parts which support it, the stability which contributes to the regularity of the operation.

A small mass of lead $c^2$ fixed at the extremity of the plate C by the intermediary of small sheets $c^3$ of felt acts as an absorber of the parasitic vibrations; the whole constituted by the plate C and the parts which support it is of sufficient mass to give it an appropriate inertia determined by experiment, in accordance with the attractive force of the electro-magnet, for obtaining uniform operation.

A resistance indicated at H is placed in shunt upon the circuit, and serves to absorb the extra break current; this resistance may consist of a carbon pencil or any other appropriate device.

When a current is sent into the apparatus in the inoperative condition the circuit is closed by the small strip $c'$ in contact with the part $a$ of the bell, the electro-magnet being energized attracts the peripheral zone of the bell and at the same time attracts the armature $e$ which being connected with the plate C displaces the latter, thereby separating the strip $c'$ from the part $a$ of the bell, which breaks the circuit; the electro-magnet being demagnetized no longer attracts the bell or the armature which permits of reëstablishing contact for again closing the circuit, and so on in succession. The current is supplied in any suitable manner as for instance, a battery K, connected by wires $k$ and $k'$ with binding posts $a^6$ and $a^7$ respectively. The post $a^7$ is connected by means of a wire $k^2$ with one terminal of the electro-magnet and the post $a^6$ is connected to one of the supports D by a wire $k^3$. The resistance H is connected to the terminals of the electro-magnet, by means of wires $k^4$ and $k^5$.

Figs. 3 and 4 represent the vibrating plate of an electric trumpet which is arranged in a similar manner, to that illustrated in the previous figures.

This apparatus consists of essentially the same members as those of the bell just described. An electro-magnet M has its poles $m'$ arranged near the face of a vibrating plate L, and in such position that when the electro-magnet is energized, the plate will be attracted toward the electro-magnet.

A blade or plate N corresponding to the plate C of the construction of Figs. 1 and 2 is mounted on a spindle $n^3$, pivoted between two supports O. The blade or plate N carries the contact piece $n'$ which in the position of rest touches a small plate $l'$ carried by the vibrating plate L. A rod P is secured to the under face of the blade or plate N at the end adjacent to the electro-magnet, and the said rod P carries a pallet $p'$, constituting an armature placed immediately opposite one of the poles $m'$ of the electro-magnet. A spring F' is arranged on the spindle $n^3$, and acts to regulate the pressure of the contact part or strip $n'$ with the piece $l'$ in the same manner as the spring F, before mentioned.

When the circuit is completed or closed, the current flows from the source of supply as for instance, a battery W, by way of the wire $u$ to the electro-magnet M and by way of the wire $v$ the vibrating plate L. From the said plate the current passes by way of the small plate $l'$ and the piece $n'$ which is in contact with the small plate $l'$ to the rod N, the spindle $n^3$, and the wire $t$ to the battery. The electro-magnet is energized and attracts the small pallet $p'$ connected with the arm N and swings the said arm to break the contact between the small plate $l'$ and the piece $n'$; thus interrupting the circuit and the electro-magnet ceases to attract the pallet $p'$ and the small plate $l'$ again contacts with the piece $n'$, again completing or closing the circuit.

The resistance S is connected with the terminals of the electro-magnet, by means of the wires $w$ and $x$, the said resistance being so connected in order to annul the break sparks.

No matter to what type of apparatus the contact device is applied this device presents the following advantages: It compensates for all causes of irregularity or breakdown such as wear due to the sparks of the extra break current and to friction, the deformation of the contact or of the fitting. It permits of overcoming the resistance due to the formation of oxid of platinum between the contact surfaces; owing to the ready displaceability of the arm, the position of which is adjusted in accordance with the amplitude of the vibration, it is possible to use solid contact wires which although relatively coarse and hard do not prevent the production of a sweet and pure sound; in addition, solid wires permit of the production of a pressure more than sufficient for insuring the passage of the current, notwithstanding the oxidation of the contacting parts, thereby rendering the passage of the current certain.

As in the case of ordinary electric bells it permits of operating with a very weak and very variable source of current consisting of from two to ten Leclanché cells in series and this without necessity for modifying the regulation.

It is desirable to bring out more clearly certain points in the operation:

(1) When the current reaches the electromagnet it attracts the vibrating body and stretches it; at the same time it attracts the pallet of the movable arm which rises and breaks the circuit. At this moment the vibrating body is suddenly abandoned by the electromagnet and, as it is elastic, it vibrates. At the same time the arm abandoned to the action of the spring reestablishes contact. During the vibration of the vibrating body, the current being frequently interrupted remains almost without influence upon the pallet and owing to its appropriate position the arm acts like an ordinary fixed contact, that is to say, with a very slight vibration, thereby enabling a definite clear sound to be obtained. To sum up, the contact is a movable break contact and behaves like a fixed contact during the vibration.

(2) In order to damp with greater certainty the parasitic vibrations, a small mass of lead, either in one piece or divided, is fixed to the arm by the intermediary of a small sheet of felt.

(3) The arm is preferably centered so that the apparatus may operate in every plane.

The invention is not limited to the constructional details represented. Thus for example instead of being mounted on a pivot the arm might be carried by a flexible strip. It should also be noted that the attraction of the pallet of the movable arm might be produced by a small special electromagnet, instead of being produced by the electro-magnet which actuates the vibrating part; this use of a small special electro-magnet might be advantageous for certain forms or arrangements of the vibrating member.

The invention relates broadly to the electro-magnetic movable break contact device described above which obviates the defects of the ordinary contact already referred to; it may be constructed with any variations and modifications not opposed to the principle of the device. Thus it may be employed for producing the vibration of any parts for which it would give the same advantages such as; diapasons, strings, reeds, bell rods etc. whether these instruments are employed for their sonority or not.

Figs. 5, 6 and 7 show by way of example constructional arrangements of the contact system described above, in cases where this system is employed for producing the vibration of the strings of musical instruments such as the piano in such a manner as to cause this instrument to emit the sounds of an organ, without replacing the ordinary striking movements so that at the will of the performer it may again become an ordinary piano, the percussion being utilized in conjunction with the operation by vibration at the commencement of this operation.

In previous attempts, apart from the great defects of regulation which have prevented these devices from being used in practice, the contacts remained constantly upon the string which presented the grave defect that the instrument could only emit the sounds of an organ because when the electric current was interrupted, and it was desired to utilize the instrument as a piano, as the contacts remained contacting with the strings they affected the purity of the sounds. The object of the devices represented in Figs. 5, 6 and 7 is to obviate this defect by enabling the contacts to be separated from the strings at will when it is desired to use the instrument as an ordinary piano, by percussion upon its strings.

These arrangements may be as follows: For the treble strings the electro-magnetic break contact device described for the vibrating bell and plate is retained, the construction then being as shown in Fig. 5. In this figure, Q designates the string that is to be caused to vibrate, and R the electromagnet. The movable contact part or lever S is secured to the spindle $s$, which is pivoted between the supports $s'$, and the spring $s^2$ acts normally to cause the portion $s^3$ of the contact part or lever S to contact with the platinum strip or wire $q$, secured to the wire Q. The opposite end of the lever S carries a plate of soft iron $s^4$, and the said plate is arranged opposite one of the poles $r$ of the electro-magnet R, in such manner as to be under the influence of the attraction of the electro-magnet, at the same time that this attraction is exerted upon the string Q. A small piece of felt $q'$ is interposed between the platinum strip or wire $q$ and the string Q to elininate any metallic ratiling on contact.

Fig. 6 shows the arrangement adopted for the other strings. In this case it is not necessary to retain the electro-magnet break device as the inertia of the movable contact part is sufficient to produce the separation of this part, owing to the shock resulting as from the percussion of the ordinary hammer upon the string. In this arrangement the wire $Q'$, has secured thereto the platinum strip or wire $q^3$, and a piece of felt $q^4$ is arranged between the wire and the strip to prevent rattling as before mentioned.

The contact part or lever $S'$ contacts at the end $s^5$ with the strip $q^3$ and at the other end the plate $s^6$ of soft iron is arranged. The electro-magnet $R'$ is for the reason above specified, in spaced relation with respect to the contact part of lever $S'$, and with the pole $r^2$ adjacent to the wire.

It will be noted that the operation of the movable contact might also be obtained as shown in Fig. 7, wherein the wire $Q^2$ has secured thereto the usual platinum strip or wire $q^5$ and a felt strip $q^6$ is arranged between the wire and the platinum strip. The contact part or lever $S^2$ has one of its ends $s^7$ arranged adjacent to the platinum strip and the other end carries the plate $s^8$ of soft iron. The electro-magnet $R^2$ has one of its poles $r^3$ adjacent to the wire, and a supplementary electro-magnet $R^3$ is arranged adjacent to that end of the contact part or lever $S^2$ provided with the plate $s^8$ of soft iron, and the said plate is arranged adjacent to the pole of the supplementary electro-magnet and acts as an armature for the said electro-magnet, instead of being arranged adjacent to the wire $Q^2$. The supplementary electro-magnet $R^3$ is for the purpose of returning the contact $s^7$ upon the platinum strip $q^5$.

What we claim and desire to secure by Letters Patent of the United States is:—

1. A contact contrivance, comprising in combination with a vibrating body and an electro-magnet acting thereon to vibrate the same, a pivotally mounted contact member completing the circuit through the electro magnet, a spring normally holding the said member in contact with the vibrating body, said member having a magnetic portion in position to be acted upon by the core of the electro-magnet to move the said contact member out of contact with the vibrating body and break the circuit.

2. A contact contrivance, comprising in combination with a vibrating body and an electro-magnet acting thereon to vibrate the same, a pivotally mounted contact member completing the circuit through the electro-magnet, said member being normally in contact with the vibrating body and having a magnetic portion upon which the core acts to move the said body out of contact with the vibrating body to break the circuit.

3. A contact contrivance comprising in combination with a vibrating body and an electro-magnet acting thereon to vibrate the same, a pivotally mounted contact member completing the circuit through the electro-magnet, a spring normally holding the said member in contact with the vibrating body, and means whereby the completion of the circuit through the magnet will move the contact member out of contact with the vibrating body to break the circuit.

4. A contact contrivance, comprising in combination with a vibrating body and an electro-magnet for vibrating the same, a pivoted lever having one end in contact with the vibrating body, the other end carrying a metallic plate in position to be acted upon by the magnet.

5. A contact contrivance, comprising in combination with a vibrating body and an electro-magnet for vibrating the same, a pivoted lever having one end in contact with the vibrating body, and means operated by the electro-magnet and acting on the opposite end of the lever for swinging said lever to move it out of contact with the vibrating body.

In witness whereof we have hereunto set our hands in the presence of two witnesses.

ALCIDE HECTOR MAÎTRE.
VICTOR HENRI MARTIN.

Witnesses:
P. PELFAURE,
ANDREA ANJOY.